May 8, 1962     E. C. KRADOSKA     3,033,024
DRUM TESTING APPARATUS
Filed June 23, 1959     3 Sheets-Sheet 1
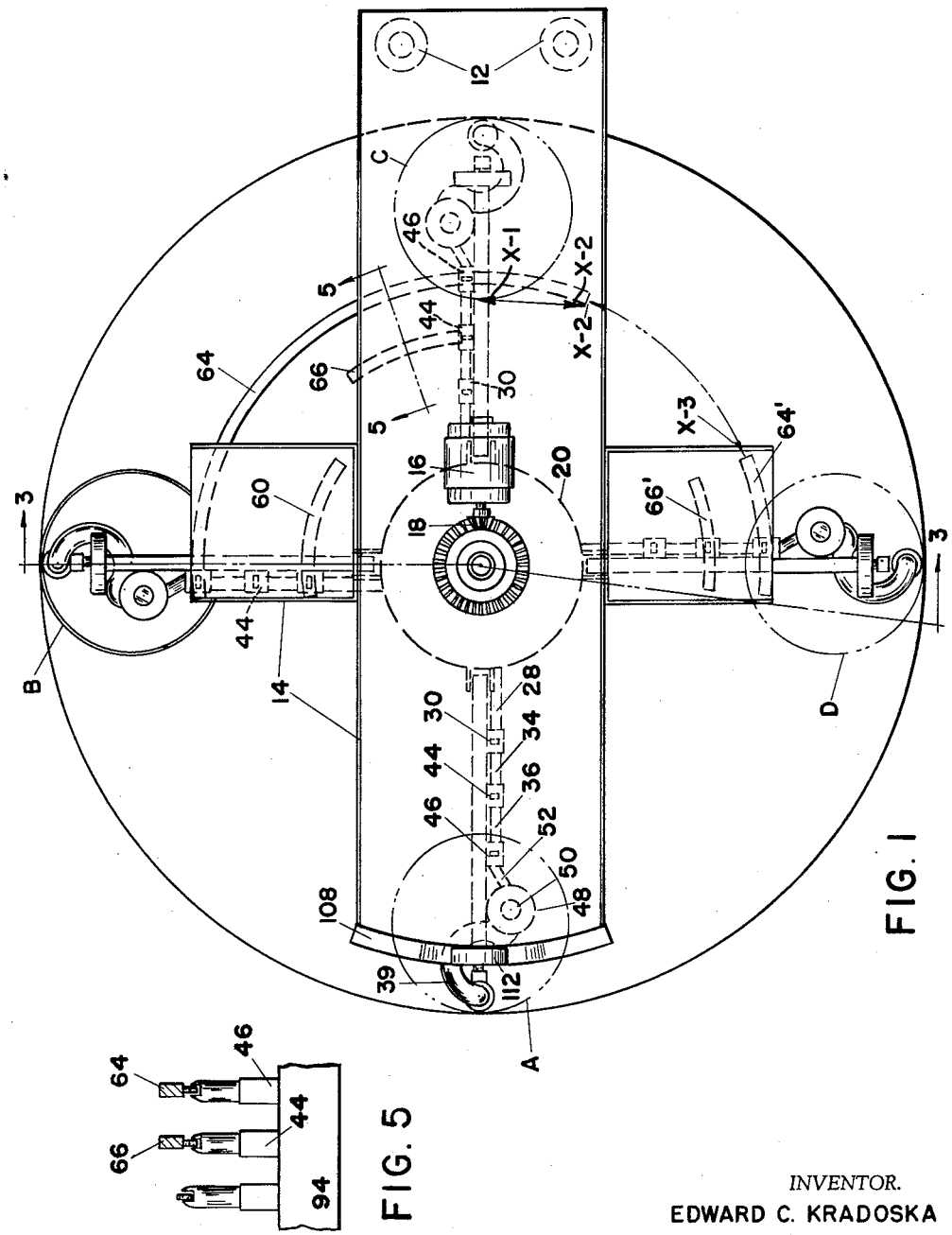
INVENTOR.
EDWARD C. KRADOSKA
BY May 8, 1962 E. C. KRADOSKA 3,033,024
DRUM TESTING APPARATUS
Filed June 23, 1959 3 Sheets-Sheet 2
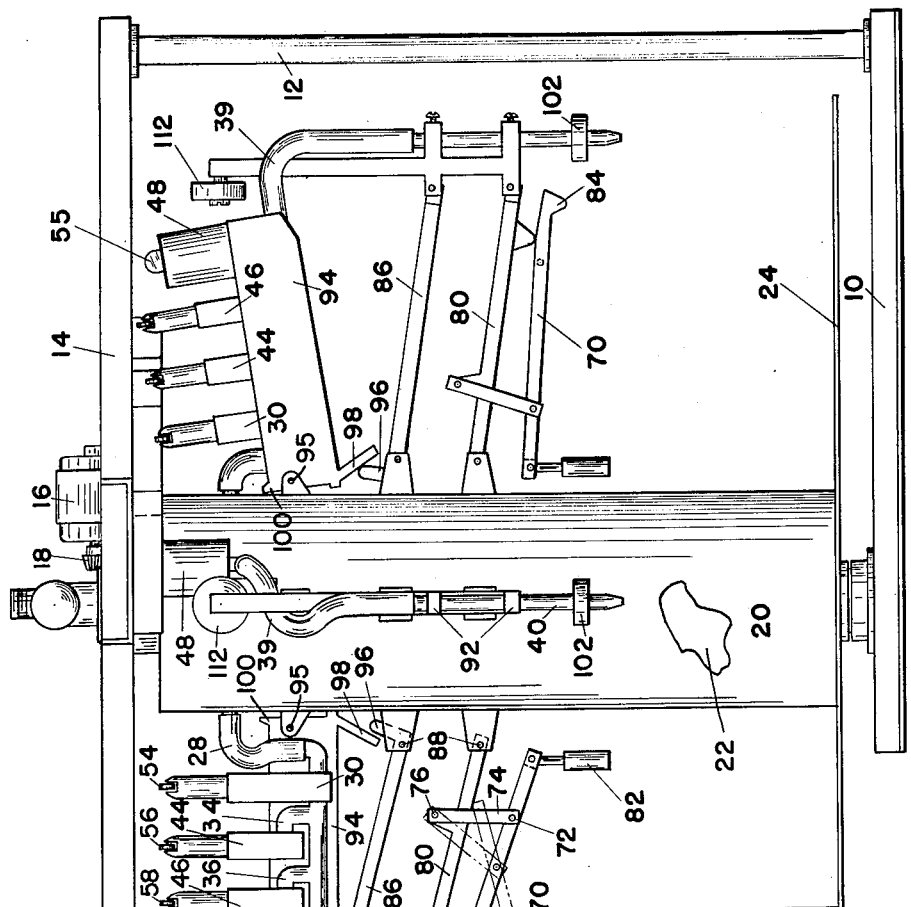
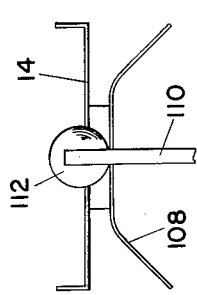
INVENTOR.
EDWARD C. KRADOSKA
BY May 8, 1962  E. C. KRADOSKA  3,033,024
DRUM TESTING APPARATUS
Filed June 23, 1959  3 Sheets-Sheet 3
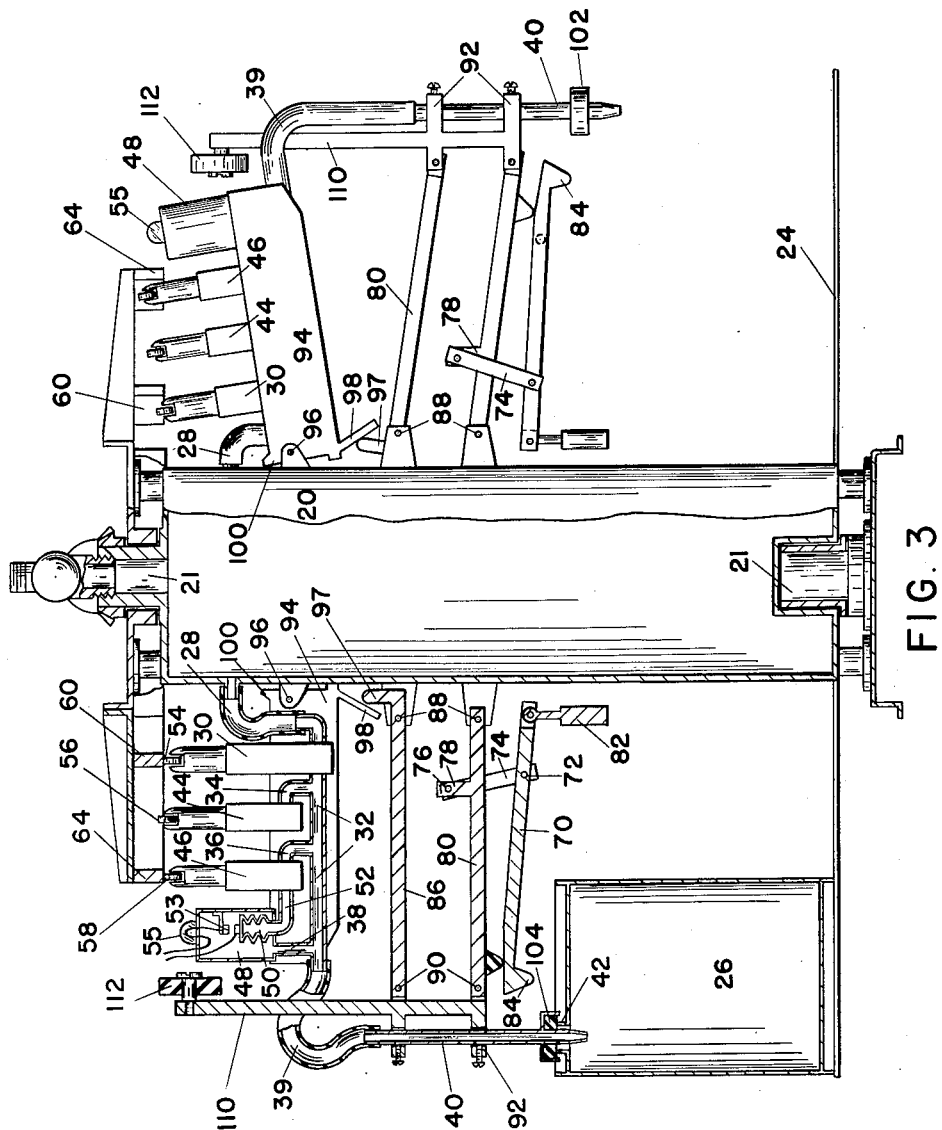
INVENTOR.
EDWARD C. KRADOSKA
BY

3,033,024
DRUM TESTING APPARATUS
Edward C. Kradoska, Melrose Park, Pa.
(3375 Richmond St., Philadelphia, Pa.)
Filed June 23, 1959, Ser. No. 822,275
10 Claims. (Cl. 73—49.2)

Steel drums, and other containers, are used for shipping, and for storing, various fluid chemicals and it is necessary that such containers be wholly leak-proof and that they be thoroughly clean so that the material placed in the drum is neither diluted nor contaminated. If a drum is to be cleaned after it has been tested for leaks, the test will not be wholly reliable because the cleaning process by chains, shot, chemicals, water, etc., might open up a hole, or a seam which, during the test may have been obstructed with rust or dirt.

One object of this invention is to provide an apparatus for, and method of, detecting leaks in drums and other containers.

It is, therefore, a further object of the invention to provide a testing apparatus in which pressurized atmospheric air is used as the testing medium, as distinguished from liquid chemicals or corrosive gases whereby the interior of the drum is not soiled, injured, or contaminated and whereby a clean and leak-proof drum will be ready to receive the material to be stored in it without any further cleansing.

In order to test for a leak, air under a predetermined pressure is introduced into the drum and after a lapse of time, the pressure in the drum is measured whereby, a pressure drop of a given value will indicate the presence of a leak and vice versa. In order to detect the slightest leak, and do it quickly, the pressure of the air must be fairly substantial and experience has shown that a pressure of about four p.s.i., will stretch a conventional steel drum and, therefore, a drop in the pressure may or may not indicate a leak.

Furthermore, the air pressure stretches the drum relatively rapidly upon initial impact and continues to do so relatively slowly, and at a decreasing rate, until a point of equilibrium is reached. Therefore, measuring the air pressure within the drum, immediately upon, or a short time after, introduction of the compressed air into the drum, cannot be relied on and, to wait until it is absolutely certain that the drum has completely ceased expanding, will take too long and therefore is out of the question.

It is, therefore, a still further object of the invention to produce an apparatus by means of which the drum can be tested almost instantly after the introduction of compressed air thereinto and whereby any drop in the pressure will always indicate a leak and will not be in any way attributable to the stretching of the drum.

A still further object of the invention is to produce an apparatus which automatically and rapidly introduces the compressed air into the drum and which indicates any drop in the pressure, so that it is merely necessary for an operator, or for another automatic mechanism, to deliver the drums to the testing apparatus and to remove leaky drums from the line.

These and other objects are attained by my invention as set forth in the following specification and the accompanying drawings in which:

FIG. 1 is a diagrammatic top plan view of a drum testing apparatus embodying the invention showing the four steps followed, and the four positions which the parts of the apparatus assume while carrying out the invention.

FIG. 2 is a diagrammatic side elevational view of, and showing the position of, the parts while carrying out the first and third steps of this invention.

FIG. 3 is similar to FIG. 2 except that the left hand portion of the view is sectioned to show details of construction, the view being taken on line 3—3 on FIG. 1.

FIGS. 4 and 5 are fragmentary views showing details of construction.

A drum testing apparatus embodying my invention includes a platform 10 to which is secured an upright 12 which carries a horizontal cross member 14. Cross member 14 carries a motor 16 which, through a gear train 18, rotates center post 20, which is journalled in upper and lower bearings 21. Within center post 20 is plenum 22 which is supplied with air under a predetermined pressure from any conventional source, not shown. Center post 20 carries the testing mechanism and a work table 24 which supports a drum 26, or other container, to be tested.

The testing mechanism includes a conduit 28 which leads to one side of normally closed valve 30, the other side of which is connected to conduit 32 which is provided with branch conduits 34, 36 and 38.

As best shown in FIG. 3, conduit 32 leads through hose 39 to a pipe 40, the lower end of which is insertable into the bung hole 42 of the drum; branch conduit 34 leads to normally closed exhaust valve 44; branch conduit 36 leads to one side of normally closed valve 46; and conduit 38 leads to chamber 48 which encloses expansible bellows 50, the interior of which is connected by conduit 52 to the other side of valve 46. By this arrangement, when valves 30 and 46 are opened, air will flow into bellows 50, into chamber 48 and into drum 26 and the initial pressure will be the same all around. If valves 30 and 46 are closed, the supply of air to drum 26 and to chamber 48 will be cut off and the initial air pressure in bellows 50 will be preserved. Under these conditions, and in the absence of a leak, the pressure on both sides of bellows 50 will be the same and the bellows will be in the position shown in FIG. 3. If the drum leaks, the pressure in chamber 48 will fall and the now greater pressure within the bellows causes it to expand and close switch 53 to energize a visual, or audible, signal 55 which will inform the operator that the drum is defective.

Compressed air, even under a moderate pressure, such as 4 p.s.i., is enough to stretch the drum and, therefore, a drop in the air pressure in the drum measured immediately after closing of valves 30 and 46 may be due to stretching of the metal and therefore is not conclusive that the drum leaks. To wait until it is certain that the drum has stopped stretching, takes too long and makes the system impractical.

To overcome this difficulty, the drum is initially charged with air under a relatively high pressure, say about 8 p.s.i., and after valve 30 is closed, but with valve 46 still open, exhaust valve 44 is open to reduce the air pressure in drum 26, chamber 48 and bellows 50 to a much lower value, say, about 4 p.s.i. Since the metal of the drum is initially stretched in response to the relatively high pressure, of about 8 p.s.i., it will cease stretching immediately upon reduction of the pressure to about 4 p.s.i. and, therefore, a drop in pressure occurring after valve 44 has been closed, will be due to a leak and not to stretching of the drum.

Valves 30, 44 and 46 can be opened and closed by hand, but, in the preferred embodiment of the invention, the stems of valves 30, 44 and 46 are provided with rollers 54, 56 and 58, and I provide cam tracks 60, 64 and 66 which are fixedly carried by cross bar 14 and which are adapted to be selectively engaged by rollers 54, 56 and 58 respectively. It will be understood that engagement of the roller on the stem of a valve with its corresponding cam track, depresses the valve stem to open the valve, and vice versa.

The operation of the parts thus far described, is as follows:

The drum 26 to be tested is placed on work table 24, at position A, pipe 40 is inserted into the drum in the manner hereinafter set forth and, center post 10 and work table 24 are rotated in clockwise direction as viewed in FIG. 1. When the drum reaches position B, rollers 54 and 58 of valves 30 and 46 will be engaged, and depressed, by cam tracks 60 and 64, respectively, to open said valves. Opening valve 30 perimts air to flow from plenum 22 into conduit 32 from which air flows through conduit 39, and pipe 40 into the drum and through conduit 38 into chamber 48. Simultaneous opening of valve 46 permits air to flow through conduit 52 into bellows 50. When drum 26 leaves position B, roller 54 of valve 30 is disengaged from cam track 60 and valve 30 is closed, but roller 58 continues to engage track 64 and valve 46 remains open. In this position of the parts, the air pressures in drum 26, in chamber 48, and in bellows 50, will be about 8 p.s.i. As the drum approaches position C, and with valve 46 still open due to continued engagement of roller 58 with cam track 64, roller 56 of exhaust valve 44 will be engaged, and depresesd, by cam track 66 to open exhaust valve 44 long enough to reduce the air pressure in drum 26, chamber 48 and bellows 50, to about 4 p.s.i. or to a value low enough to arrest expansion of the drum. As the drum moves toward position D, and after roller 56 has left cam track 66 to close exhaust valve 44, the drum will move from point X–1 to point X–2 with valve 46 still open. While the drum is moving between these points, the pressures in bellows 50, chamber 48 and drum 26, will have time to equalize and an identical static pressure will develop in all three places. After roller 58 of valve 46 is disengaged from cam track 64 to close valve 46, and while the drum is moving from point X–2 to point X–3, the drum will be "on test" in the sense that any drop in the pressure will indicate a leak. Since, with the closing of valve 46, the pressure in bellows 50 will remain constant, any leak in the drum will reduce the pressure in chamber 48 and will allow bellows 50 to expand to close switch 53 and energize signal 55. Conversely, in the absence of a leak, the pressure in chamber 48 and in bellows 50 will remain the same, the bellows will not close switch 53 and the lack of a signal will indicate that the drum is sound.

In order to facilitate alignment of the bung hole of the drum with the lower end of pipe 40 which, as will hereinafter appear, is raised out of, and is lowered into, the bung hole automatically, I provide arm 70 which is pivoted at 72 to one end of link 74, the other end of which is pivoted at 76 to lug 78 on arm 80 which will be hereinafter further referred to. Arm 70 may be provided with a weight 82, or it may be biased by a spring, so that it normally occupies the position shown in FIG. 3. To align the bung hole of the drum with pipe 40, arm 70 is pulled outwardly and downwardly and the drum is maneuvered until the conical feeler 84 engages the bung hole. Since arm 70 is carried by arm 80 which also carries pipe 40, the conical feeler 84 of arm 70 becomes, in effect, a temporary extension of pipe 40. This relationship can be clearly seen from the broken line position of arm 70 in FIG. 2.

In order to limit the downward movement of pipe 40 in the absence of a drum there beneath and to prevent opening of valves 30, 34 and 64 except when pipe 40 is inserted into a drum, pipe 40 is rigidly carried by previously mentioned arm 80 and by arm 86, the inner ends of which are pivoted at 88 to center post 20 and the outer ends of which are pivoted at 90 to collars 92 which are clamped around pipe 40. Also, as shown in this figure, valves 30, 44 and 46 and chamber 48 are carried by arm 94, the inner end of which is pivoted at 95 to center post 20. By this arrangement, arms 80, 86 and 94 and pipe 40, if not restrained, will move downwardly and, to limit this movement to the range needed for inserting pipe 40 into, and for withdrawing it from, the drum, arm 86 is provided with an elbow 96 which, when arm 86 moves downwardly, engages a similar elbow 98 on arm 94 and tilts said arm upwardly, or from the position shown at the left hand side, to the position shown in the right hand side, of FIG. 2. The upward movement of arm 94 is, in turn, limited by lug 100 which, when arm 94 is tilted upwardly, abuts center post 20. Since, in this position, elbow 96 also abuts elbow 98, limiting the upward movement of arm 94 also limits the downward tilting of arms 80 and 86 and thus limits the downward movement of pipe 40 which is carried by these arms.

In order to seal around pipe 40 when it is inserted into the drum and, in order to make accurate alignment of the pipe with the bung hole unnecessary, the lower end of the pipe is provided with a cup-like gasket 104 which is highly compressible and is larger than the bung hole.

It will be noted that, when arm 94 is in its upwardly tilted position, as shown at the right hand side of FIGS. 2 and 3, valves 30, 44 and 46 will also be tilted and their respective rollers 54, 56 and 58 will be out of reach of cam tracks 60, 64 and 66. This means that these valves, and particularly valve 30, will remain closed and no air will flow out of plenum 22 unless pipe 40 is inserted through the bung hole and the valves are in their vertical positions, as shown at the left hand side of FIGS. 2 and 3.

In order to raise pipe 40 automatically from its lower, right hand, to its upper left hand position, as viewed in FIGS. 2 and 3, I provide cam track 108 which overlies position A, (FIG. 1) and I provide collars 92 with an upright 110 which carries a roller 112 which rides on track 108 to raise pipe 40 to the position shown at the left hand side of FIG. 2. As the drum moves toward position B, and before any of the valves is opened, roller 112 drops off cam track 108 to permit the lower end of pipe 40 to enter the bung hole of the drum.

Since even a moderate air pressure can be harmful, or at least annoying, if abruptly released in the vicinity of the operator of the machine, I provide means for exhausting the air from the drum after the test is completed and before the drum reaches the point, immediately in advance of position A, at which the tested drum is removed and a drum to be tested is placed on the work table. In the preferred embodiment illustrated air is exhausted from the drum by means of cam tracks 64′ and 66′ which, in effect, are detached extensions of tracks 64 and 66, and are adapted to be engaged by rollers 56 and 58 of valves 44 and 46 to open said valves while the drum is traversing position C and is still at a substantial distance from loading and unloading position A. By this arrangement, the drum is either empty, or the air pressure remaining in it is so low that the escape of the air on withdrawal of pipe 40 from the drum will not have any harmful, or objectionable effects.

The operation of the entire apparatus is as follows:

The operator standing near position A places a drum on the work table and aligns the bung hole with feeler 84 of arm 70. While this is being done, roller 112 is riding on track 108 and pipe 40 is in its upper position, as shown at the left hand side of FIG. 2. As the work table rotates, roller 112 drops off track 108 and pipe 40 enters bung hole 42 of the drum. If, as the drum is passing through position C and while it is approaching position D, signal 55 is energized, the operator marks the drum to indicate that it is defective, and vice versa. As the drum approaches position A, roller 112 rides on cam track 108 to lift pipe 40 out of the drum. The tested drum is now removed and another drum is placed on the work table to begin a new cycle. It will be noted that lifting pipe 40 out of the drum moves arms 70 and 86 about their pivots 88, but that it does not affect the position of arm 94.

While in the foregoing description reference is made to drums and to expansible bellows, it is to be understood that the invention is applicable to any other type of container and that any pressure responsive member can be used in place of the bellows.

What I claim is:

1. Apparatus for testing a container against leaking, said apparatus including a rotary platform adapted to receive a container to be tested, an overhead carriage rotatable with said platform, a plenum containing fluid under a predetermined pressure and rotatable with said platform, a conduit leading from said source of pressure into a container to be tested, a first, normally closed valve rotatable with said carriage and connected to said conduit for controlling the flow of fluid from said source to said conduit and into said container, a pressure responsive device also rotatable with said platform, a chamber enclosing one side of said device and permanently connected in flow relation to said conduit permanently to subject said one side of said device to the fluid pressure in said container, a second normally closed valve connected to the other side of said pressure responsive device and to said conduit at a point intermediate said first valve and said container, for controlling the flow of fluid from said conduit to the other side of said pressure responsive device, a fixed overhead carriage, actuating means carried by said fixed carriage and engageable with said first and second valves, upon rotation of said platform, simultaneously to open both of said valves for a predetermined length of time to subject the interior of the container and both sides of said pressure responsive device to said predetermined fluid pressure whereby a subsequent drop in the fluid pressure in the container will unbalance the pressure on opposite sides of the pressure responsive device, and means for signalling said unbalance.

2. The structure recited in claim 1 in which said actuating means includes a pair of cams of predetermined lengths, and each of said valves includes a feeler engageable with one of said cams to open the corresponding valve as long as the feeler of said valve rides on the corresponding cam.

3. Apparatus for testing a container against leaking, said apparatus including a rotary platform adapted to receive a container to be tested, an overhead carriage rotatable with said platform, a plenum containing fluid under a predetermined pressure calculated to expand said container and rotatable with said platform, a conduit leading from said source of pressure into a container to be tested, a first normally closed valve rotatable with said carriage and connected to said conduit for controlling the flow of fluid from said source to said conduit and into said container, a pressure responsive device also rotatable with said platform, a chamber enclosing one side of said device and permanently connected in flow relation to said conduit permanently to subject said one side of said device to the fluid pressure in said container, a second normally closed valve connected to the other side of said pressure responsive device and to said conduit at a point intermediate said first valve and said container for controlling the flow of fluid from said container the other side of said pressure responsive device, a fixed overhead carriage, and a first actuating means carried by said fixed carriage and engageable with said first and second valves upon rotation of said platform simultaneously to open both of said valves for a predetermined length of time to subject the interior of said container and both sides of said pressure responsive device to said predetermined fluid pressure, a third, normally closed exhaust valve connected in flow relation to said conduit, a second actuating means angularly spaced from said first actuating means and engageable with said third valve upon further rotation of said platform temporarily to open said second valve, said exhaust valve to reduce the fluid pressure in said container and on said other side of said device to a valve insufficient further to expand said container, whereby, a further drop of pressure in said container and on said one side of said pressure responsive device will unbalance the pressure on the opposite sides of said device, and means for measuring said imbalance.

4. The structure recited in claim 3 in which said actuating means include cams and said valves include feelers engageable with said cams to open said valves, and means preventing engagement of any of said feelers with any of said cams except when a container is on said platform and said conduit is inserted in said container.

5. Apparatus for testing a container against leaking, said apparatus including a rotary platform for supporting a container to be tested, said container having an opening in the upper end thereof, a plenum carried by said platform for storing fluid under pressure, an arm rotatable with said platform, a conduit carried by said arm and connected at one end thereof to said plenum, a normally closed valve carried by said arm for controlling the flow of fluid from said plenum into said conduit, a spout carried by the other end of said conduit and insertable in said opening, means for limiting the movement of said spout into said opening and for providing a fluid tight seal between said spout and said opening, a fixed cam overhanging said platform and located in the path of movement of said valve so that, upon rotation of said platform, said cam engages and opens said valve to admit fluid into said container, means pivotally mounting said arm for free vertical movement about a horizontal axis whereby said spout, said conduit and said arm are free to move downwardly when said spout is not inserted in the opening of the container, and safety means operable by the initial downward movement of said spout for limiting the downward movement of said conduit and for tilting said valve whereby the path of movement of said valve will be out of alignment with said cam and the valve will remain closed, the rotation of said platform notwithstanding.

6. The structure recited in claim 5 in which said safety means includes a second arm having its outer end connected to said spout and its inner end pivotally connected to a support rotatable with said platform, and means at the inner end of said arm which, on downward movement of said spout, engages the corresponding end of the first mentioned arm to tilt the latter.

7. A drum testing apparatus including a rotary platform supporting a drum to be tested for leaks, an arm rotatable with said platform, a source of air under pressure of a first predetermined value, a conduit connecting said source with said drum, a first, normally closed valve controlling the flow of air from said source to said conduit, a movable pressure responsive device, a second, normally closed, valve controlling the flow of air from said conduit to one side of said device, a normally closed exhaust valve connecting said conduit with the atmosphere, a pipe connecting said drum in flow relation to the other side of said pressure responsive device, a first, fixed, valve opening member located in the path of movement of said first valve and engageable therewith to admit air into said conduit, said drum and said other side of said pressure responsive device, a second, fixed, valve opening member located in the path of movement of said second valve and arranged for engagement therewith to admit air to said one side of said pressure responsive device while said first valve is still open, a third valve opening member located in the path of movement of said exhaust valve and arranged for engagement therewith while said second valve is still open, but with said first valve closed to reduce the pressure in said drum and on both sides of said pressure responsive device to a second, lower, predetermined value, a signal-activating switch operable by movement of said pressure responsive device in response to relative increase of pressure on said one side thereof to activate said signal, and means for successively bringing said valve opening members into successive engagement with their respective valves in the order above set forth.

8. The structure recited in claim 7 and fourth and fifth valve opening members located in the path of movement of said valves and simultaneously engageable with said second and third valves for exhausting the air from said drum and from both sides of said device.

9. The structure recited in claim 8 in which said valve opening members are spaced, arcuate tracks located above and engageable with the stems of said valves during predetermined portions of the movement of the valves therebelow.

10. A drum testing apparatus including a movable platform for supporting a drum to be tested, an arm carried by said platform and movable to a first position and to a second position, a normally closed valve carried by said arm, a conduit carried by said arm for insertion into said drum to connect said drum to said valve, and a fixed valve opening member located in the path of movement of said arm and engageable with said valve when said arm is in its first position, said conduit being operative upon insertion into said drum to move said arm to said first position and being operative upon disengagement from said drum to move said arm to said second position to prevent engagement of said valve with said valve opening member.

References Cited in the file of this patent

UNITED STATES PATENTS

| | | |
|---|---|---|
| 1,117,346 | Dickerson | Nov. 17, 1914 |
| 2,083,827 | Cameron | Jan. 15, 1937 |
| 2,118,703 | Giamo | May 24, 1938 |
| 2,137,389 | Chapman | Nov. 22, 1938 |
| 2,311,115 | Krueger | Feb. 16, 1943 |
| 2,387,743 | Cameron | Oct. 30, 1945 |
| 2,449,556 | Kirkley | Sept. 21, 1948 |
| 2,573,053 | Pearlman | Oct. 30, 1951 |
| 2,667,062 | Johns | Jan. 26, 1954 |
| 2,872,806 | Mamzic | Feb. 10, 1959 |